(12) United States Patent
Barribeau

(10) Patent No.: US 9,756,198 B1
(45) Date of Patent: Sep. 5, 2017

(54) COORDINATION OF CAPTURE AND MOVEMENT OF MEDIA

(71) Applicant: HEWLETT-PACKARD DEVELOPMENT COMPANY, L.P., Houston, TX (US)

(72) Inventor: Jeremy Barribeau, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/141,417

(22) Filed: Apr. 28, 2016

(51) Int. Cl.
*H04N 1/04* (2006.01)
*H04N 1/00* (2006.01)

(52) U.S. Cl.
CPC ..... *H04N 1/00278* (2013.01); *H04N 1/00315* (2013.01); *H04N 1/00702* (2013.01); *H04N 1/00734* (2013.01); *H04N 1/00785* (2013.01)

(58) Field of Classification Search
CPC ....... H04N 2201/0081; H04N 1/00588; H04N 1/00708; H04N 1/00779; H04N 1/00602; H04N 1/0071; H04N 1/00734; H04N 1/00769; H04N 1/00745; H04N 1/00748; H04N 1/121; H04N 1/00037; G03F 7/2041
USPC ...... 358/474, 1.15, 498, 496, 483, 486, 497; 235/386, 51, 50 A, 50 B, 57; 382/199, 382/254, 274; 399/1, 21, 374, 382, 393, 399/394, 80, 81, 82, 88
See application file for complete search history.

(56) References Cited

U.S. PATENT DOCUMENTS

| | | | | |
|---|---|---|---|---|
| 4,626,925 A | * | 12/1986 | Toyoda | H04N 1/0405 348/343 |
| 6,646,768 B1 | * | 11/2003 | Andersen | G03G 15/607 358/474 |
| 7,411,608 B1 | * | 8/2008 | Moskaluk | B41J 3/36 347/108 |
| 7,929,019 B2 | * | 4/2011 | Ohmura | H04N 5/772 348/207.2 |
| 8,610,935 B1 | | 12/2013 | McKinley et al. | |
| 8,619,313 B2 | * | 12/2013 | Baggs | G03G 15/60 358/1.18 |

(Continued)

OTHER PUBLICATIONS

Readdle, Inc. Scanner Pro 6: Turn your iPhone into a portable scanner.

*Primary Examiner* — Negussie Worku
(74) *Attorney, Agent, or Firm* — HP Inc. Patent Department

(57) ABSTRACT

A described example system may include a connection engine, a capture engine, and a command engine. In that example, the connection engine wirelessly connects to an imaging device having a media location for placing media; the capture engine captures an image of media at the media location; and the command engine coordinates movement of the media in response to a capture operation or in preparation to perform the capture operation. In another example, an imaging device includes a media tray, a pick, a processor resource, and a memory resource having executable instructions that cause coordination of the pick to, in response to an indication that a sheet of media is captured from a capture device, generate movement of the sheet of media away from the media tray or movement the sheet of media on to the media tray.

15 Claims, 5 Drawing Sheets

(56) References Cited

U.S. PATENT DOCUMENTS

| | | | |
|---|---|---|---|
| 8,823,962 B2 * | 9/2014 | Maghakian | B41J 3/44 |
| | | | 358/1.13 |
| 8,860,989 B2 | 10/2014 | Link et al. | |
| 8,941,847 B2 | 1/2015 | Hilbert et al. | |
| 9,007,633 B2 | 4/2015 | Sakaida et al. | |
| 2008/0231899 A1 * | 9/2008 | Morimoto | G06F 3/1204 |
| | | | 358/1.15 |
| 2012/0092714 A1 * | 4/2012 | Suzuki | G06F 3/1212 |
| | | | 358/1.15 |
| 2014/0029032 A1 * | 1/2014 | Hilbert | H04N 1/00307 |
| | | | 358/1.13 |
| 2014/0098176 A1 * | 4/2014 | Isaacs | H04L 67/20 |
| | | | 348/14.01 |
| 2014/0185088 A1 * | 7/2014 | Lee | H04N 1/00342 |
| | | | 358/1.15 |
| 2014/0226181 A1 * | 8/2014 | Shibukawa | H04N 1/00127 |
| | | | 358/1.15 |
| 2014/0268225 A1 * | 9/2014 | Shibukawa | H04N 1/00204 |
| | | | 358/1.15 |
| 2014/0325085 A1 * | 10/2014 | Moritomo | H04L 65/1013 |
| | | | 709/229 |
| 2015/0123966 A1 * | 5/2015 | Newman | G06T 19/006 |
| | | | 345/419 |
| 2015/0181072 A1 * | 6/2015 | Kasahara | H04N 1/19594 |
| | | | 358/475 |
| 2016/0050169 A1 * | 2/2016 | Ben Atar | H04M 1/72544 |
| | | | 709/206 |
| 2016/0261775 A1 * | 9/2016 | Jung | H04N 1/6055 |
| 2016/0309085 A1 * | 10/2016 | Ilic | G06T 3/4038 |
| 2016/0311240 A1 * | 10/2016 | Bianchi | B41J 29/393 |

\* cited by examiner

COORDINATION OF CAPTURE AND MOVEMENT OF MEDIA

BACKGROUND

Imaging devices, such as printing devices, include mechanisms to assist functionality of the imaging device. Multifunction peripherals, such as multifunction printers, may include a scanner and an automatic document feeder (ADF) to provide a user the ability to scan or copy an input media target to generate physical reproductions or digitize the content of the media target.

DETAILED DESCRIPTION

In the following description and figures, some example implementations of mobile capture apparatus, imaging devices, systems, and/or methods of coordination of capture and movement of media are described. An imaging device, as used herein, may include any device with components to move media (e.g., a sheet of paper), such as by using a paper pick. For example, an imaging device may be a device that is able to move media from one location to another. An imaging device may also include a component for performing an imaging operation, such as copying or printing. In examples described herein, a "printing device" may be a device to print content on a physical medium (e.g., paper or a layer of powder-based build material, etc.) with a printing fluid (e.g., ink) or toner. An example of printing fluid is ink ejectable from a printhead. In the case of printing on a layer of powder-based build material, the printing device may utilize the deposition of printing fluids in a layer-wise additive manufacturing process. A printing device may utilize suitable printing consumables, such as ink, toner, fluids or powders, or other raw materials for printing. In some examples, a printing device may be a three-dimensional (3D) printing device. Media, as used herein, may be any form of material usable with a printing device. The media may be any suitable form able to contain content captureable by a capture circuitry (e.g., a camera).

Some printing devices are limited in capabilities. For example, a low-end printer may not have a scanning feature. To capture media content, a user may be required to use a secondary device with capturing technology, such as using a camera.

Various examples described below relate to using a movement mechanism (e.g., a pick) of a paper feed mechanism to move media into or out of a capture zone in which the media may be captured by a capture device, such as a mobile phone with a camera. Capture technology may continue to develop and be adopted by consumers quickly. Capture devices with such capture technology may provide a better image quality capture over the life span of the printer, for example if a mobile phone is replaced within a shorter time period than the printer. In that example, the camera may be more likely used to capture content than a printer with scanning ability when the camera captures with higher image quality. The systems and methods discussed herein facilitate capture of multipage documents through coordination of media movement assistance of an imaging device and capture ability of an independent capture device.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus.

Figure 1:
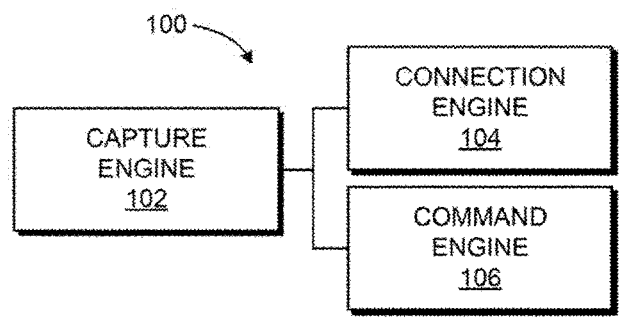
FIGS. 1 and 2 are block diagrams depicting example systems for coordination of capture and movement of media.
Figure 2:
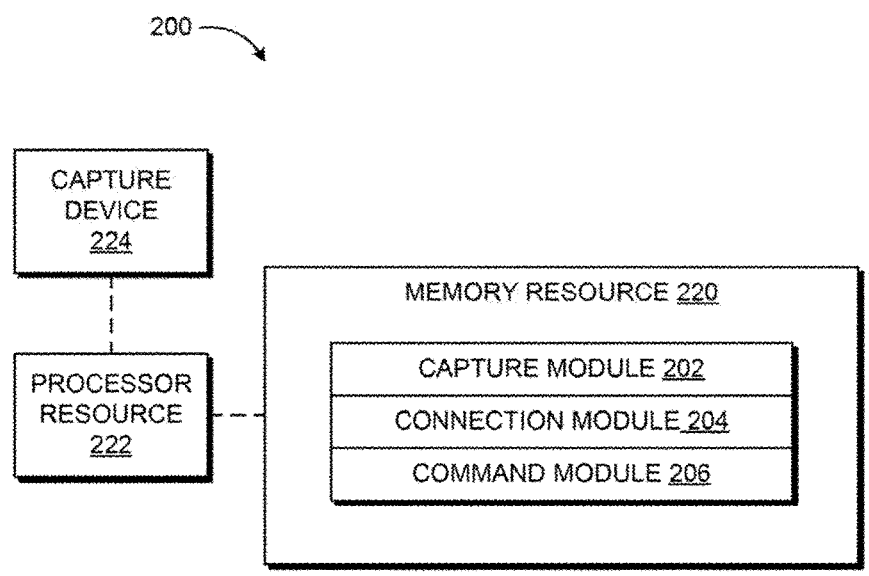

FIGS. 1 and 2 are block diagrams depicting example systems 100 and 200. Referring to FIG. 1, the example system 100 of FIG. 1 generally includes a capture engine 102, a connection engine 104, and a command engine 106. In general, the command engine 106 may coordinate operations between a capture device (e.g., a device capable of capture operations) and an imaging device in communication with the capture device (e.g., via the connection engine 104), where the capture device is able to capture images of media via the capture engine 102 and the imaging device is able to move the media in and/or out of the capture zone (e.g., a target area for image capture by the capture device.) The command engine 106 may, for example, continue to perform capture cycles (e.g., manage coordination of capture operations and management operations) for a multipage document and relieve a user of some manual interactions, such as moving pages in or out of the capture zone.

The capture engine 102 represents any circuitry or combination of circuitry and executable instructions to capture content of media. For example, the capture engine 102 may include camera device and a controller programmed with instructions to operate the camera device to take a picture of a sheet of paper. The capture engine 102 may be used with a camera device pointed at a media location associated with an imaging device to capture an image of media at the media location. For example, a camera may be held and kept stationary (e.g., substantially stationary) while the image is captured of a sheet of media stationary (e.g., substantially stationary) at the media location while the media is captured.

The capture engine 102 may be enabled with processing capabilities. For example, the capture engine 102 may include a combination of circuitry and executable instructions to modify the captured image using an image processing technique. For another example, the image captured of a media location (e.g., a capture zone) may be processed based on a perspective determination of the camera relative to a capture zone plane (e.g., process the image to compensate for keystone distortion). For yet another example, the capture engine 102 may provide a preview of a completed capture job including the captured image of a sheet of media at the media location and any other sheets of the media stack.

The capture engine 102 may manage the capture functionality of a mobile device. For example, the capture engine 102 may be a combination of circuitry and executable instructions that enable a capture operation in response to a first indication from the imaging device that the media is sensed at the media location and disable a capture operation in response to a second indication from the imaging device that the media is not sensed at the media location. In this manner, the capture ability may be enabled with a paired imaging device with a mechanism for detecting (e.g., sensing) whether there is media at the media location (or otherwise ready for a capture session to begin or continue).

The connection engine 104 represents any circuitry or combination of circuitry and executable instructions to wirelessly connect to an imaging device having a media location for placing media. For example, the connection engine 104 may be a combination of circuitry and executable instructions to perform a pairing operation with an imaging device. The wireless connection may be achieved using any wireless connection method, such as radio frequency communication or personal area network communication.

The command engine 106 represents any circuitry or combination of circuitry and executable instructions to coordinate media capture and media movement. For example, the command engine 106 may be a combination of circuitry and executable instructions to instruct the imaging device to coordinate movement of the media in response to capture of the image or in preparation to capture the image. For another example, the command engine 106 may be a combination of circuitry and executable instructions to cause an image to be captured in response to an indication that the media has passed out of line of sight of a camera of the mobile device.

The command engine 106 may manage a capture session of multiple capture cycles. A capture cycle, as used herein, includes a capture operation and a movement operation. As used herein, a capture operation refers to an operation of a device to capture content of media at a location and a movement operation refers to an operation of a device to move the media away from the location or into the location. For example, a capture operation may be an image capture operation of a sheet of media and a movement operation may be a movement of the sheet media away from a capture zone after being captured or towards the capture zone to be captured.

The capture engine 102 and the command engine 106 may operate in conjunction to perform capture cycles until an indication is received from the imaging device that there is no media at the media location. For example, the command engine 106 may initiate a capture session based on a load mechanism being activated, continue capture cycles until the load mechanism is deactivated, and provide an indication that the capture session is complete in response to deactivation of the load mechanism.

The command engine 106 may coordinate enablement/disablement operations and waiting operations. For example, the command engine 106 may send a command to the imaging device in response to a determination of whether to disable an imaging device feature based on a state of a capture session. For another example, the command engine 106 may perform a waiting operation to receive an indication that media is located on a tray of an imaging device. For yet another example, the command engine 106 may coordinate performance of a first waiting operation to listen for (e.g., receive) an indication that a media sheet is available for capture on an imaging device, a capture operation to capture an image of the media sheet in response to receipt of the indication that the media sheet is available, a movement operation to send an instruction to an imaging device to move the media sheet in response to the capture operation or in preparation to perform the capture operation, and a second waiting option after returning to a capture state while media still exists on an imaging tray after a capture operation is completed.

Figure 3:
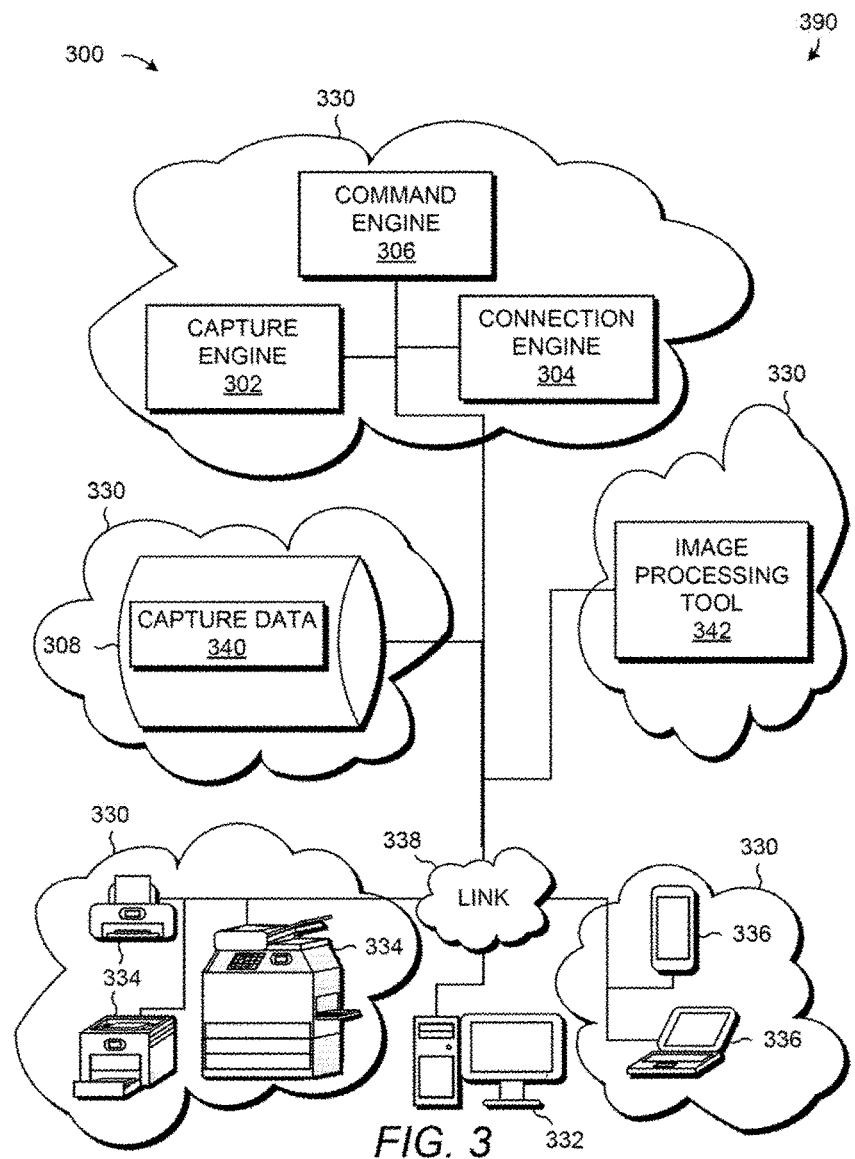
FIG. 3 depicts an example environment in which various systems for coordination of capture and movement of media may be implemented.
Figure 4:
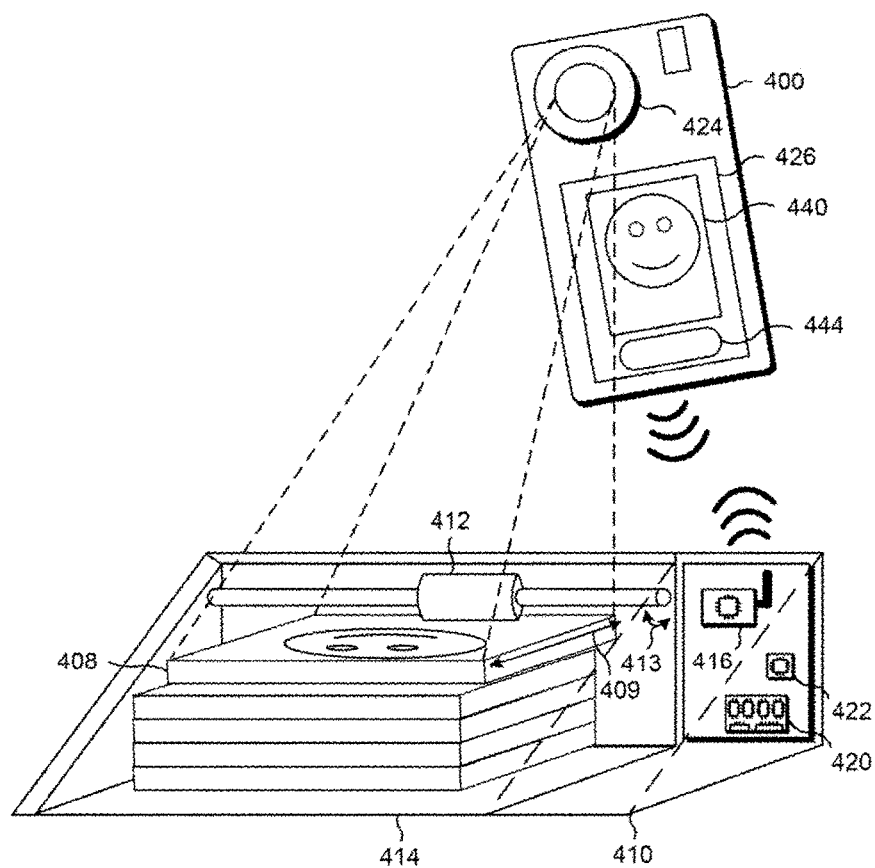
FIG. 4 depicts an example diagram of an example mobile capture device and an example imaging device.
Figure 5:
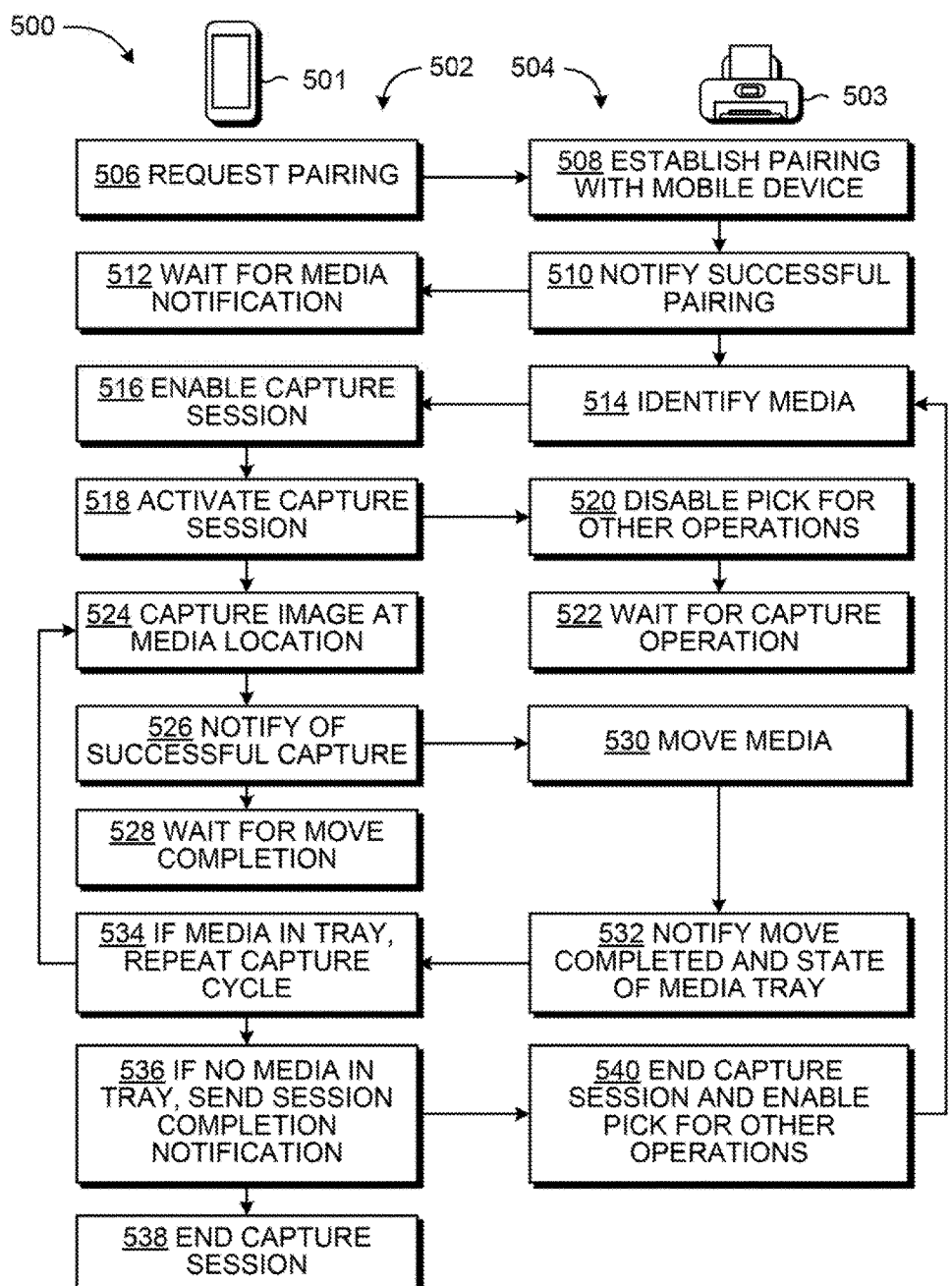
FIGS. 5 and 6 are a flow diagrams depicting example methods of coordination of capture and movement of media.
Figure 6:
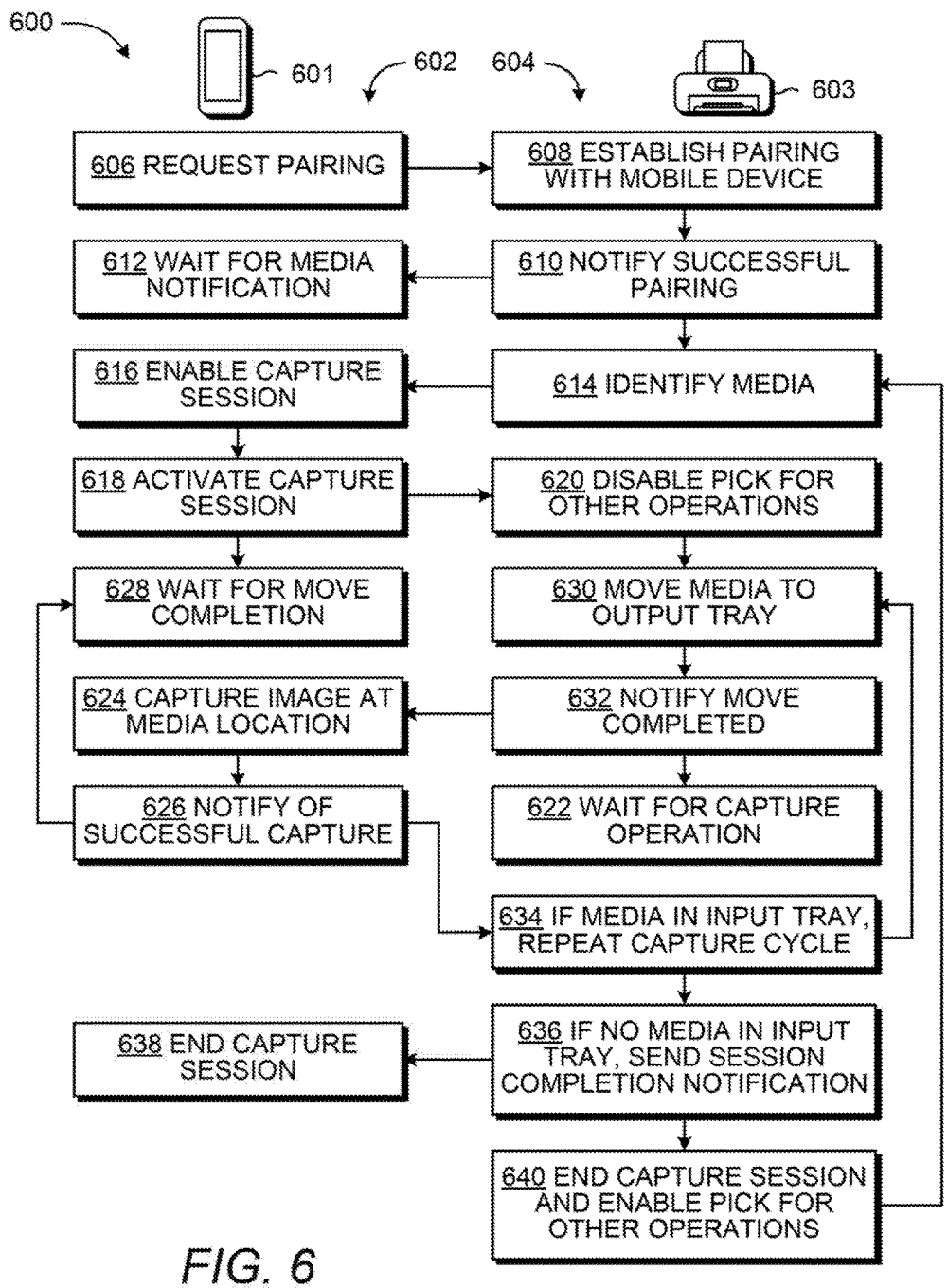

In some examples, functionalities described herein in relation to any of FIGS. 1-4 may be provided in combination with functionalities described herein in relation to any of FIGS. 5 and 6.

FIG. 2 depicts the example system 200 may comprise a memory resource 220 operatively coupled to a processor resource 222. The processor resource 222 may be operatively coupled to a capture device 224.

Referring to FIG. 2, the memory resource 220 may contain a set of instructions that are executable by the processor resource 222. The set of instructions are operable to cause the processor resource 222 to perform operations of the system 200 when the set of instructions are executed by the processor resource 222. The set of instructions stored on the memory resource 220 may be represented as a capture module 202, a connection module 204, and a command module 206. The capture module 202, the connection module 204, and the command module 206 represent program instructions that when executed function as the capture engine 102, the connection engine 104, and the command engine 106 of FIG. 1, respectively. The processor resource 222 may carry out a set of instructions to execute the modules 202, 204, 206, and/or any other appropriate operations among and/or associated with the modules of the system 200. For example, the processor resource 222 may carry out a set of instructions to coordinate media capture and media movement by performance of a waiting operation (e.g., a waiting operation to listen for an indication that a media sheet is available for capture on an imaging device), a capture operation (e.g., an operation to capture an image of the media sheet in response to receipt of an indication that the media sheet is available), and a movement initiation operation (e.g., an operation to send an instruction to an imaging device to move the media sheet in response to the capture operation or in preparation to perform the capture operation.) For another example, the processor resource 222 may carry out a set of instructions to coordinate media capture and media movement by performance of operations discussed with respect to FIGS. 5 and 6.

Although these particular modules and various other modules are illustrated and discussed in relation to FIG. 2 and other example implementations, other combinations or sub-combinations of modules may be included within other implementations. Said differently, although the modules illustrated in FIG. 2 and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules.

The processor resource 222 is any appropriate circuitry capable of processing (e.g., computing) instructions, such as one or multiple processing elements capable of retrieving instructions from the memory resource 220 and executing those instructions. For example, the processor resource 222 may be a central processing unit (CPU) that enables coordination of media capture and media movement by fetching, decoding, and executing modules 202, 204, and 206. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). The processor resource 222 may include multiple processing elements that are integrated in a single device or distributed across devices. The processor resource 222 may process the instructions serially, concurrently, or in partial concurrence.

The memory resource 220 represents a medium to store data utilized and/or produced by the system 200. The medium is any non-transitory medium or combination of non-transitory media able to electronically store data, such as modules of the system 200 and/or data used by the system 200. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. The memory resource 220 may be said to store program instructions that when executed by the processor resource 222 cause the processor resource 222 to implement functionality of the system 200 of FIG. 2. The memory resource 220 may be integrated in the same device as the processor resource 222 or it may be separate but accessible to that device and the processor resource 222. The memory resource 220 may be distributed across devices.

In the discussion herein, the engines 102, 104, and 106 of FIG. 1 and the modules 202, 204, and 206 of FIG. 2 have been described as circuitry or a combination of circuitry and executable instructions. Such components may be implemented in a number of fashions. Looking at FIG. 2, the executable instructions may be processor-executable instructions, such as program instructions, stored on the memory resource 220, which is a tangible, non-transitory computer-readable storage medium, and the circuitry may be electronic circuitry, such as processor resource 222, for executing those instructions. The instructions residing on the memory resource 220 may comprise any set of instructions to be executed directly (such as machine code) or indirectly (such as a script) by the processor resource 222.

In some examples, the system 200 may include the executable instructions may be part of an installation package that when installed may be executed by the processor resource 222 to perform operations of the system 200, such as processes described with regards to FIGS. 5 and 6. In that example, the memory resource 220 may be a portable medium such as a compact disc, a digital video disc, a flash drive, or memory maintained by a computer device, such as a server, from which the installation package may be downloaded and installed. In another example, the executable instructions may be part of an application or applications already installed. The memory resource 220 may be a non-volatile memory resource such as read only memory (ROM), a volatile memory resource such as random access memory (RAM), a storage device, or a combination thereof. Example forms of a memory resource 220 include static RAM (SRAM), dynamic RAM (DRAM), electrically erasable programmable ROM (EEPROM), flash memory, or the like. The memory resource 220 may include integrated memory such as a hard drive (HD), a solid state drive (SSD), or an optical drive.

FIG. 3 depicts example environments in which various example systems 300 for coordination of capture and movement of media may be implemented. The example environment 390 is shown to include an example system 300 for coordination of media capture and media movement. The system 300 (described herein with respect to FIGS. 1 and 2) may represent generally any circuitry or combination of circuitry and executable instructions to coordinate capture of media and movement of media. The system 300 may include a capture engine 302, a connection engine 304, and a command engine 306 that are the same as the capture engine 102, the connection engine 104, and the command engine 106 of FIG. 1, respectively, and the associated descriptions are not repeated for brevity. The system 300 may include a data store 308 and an image processing tool 342. The capture data 340 obtained by the captured engine 302 may be stored on a data store 308. The data store 308 may also include any appropriate data used by the engines 302, 304, 306, or other components of the system 300. The image processing tool 342 may be used to modify an image or otherwise prepare captured images to complete a capture session. The engines 302, 304, and 306 may be integrated into a compute device, such as a mobile device 336. The engines 302, 304, and 306 may be integrated via circuitry or as installed instructions into a memory resource of the compute device.

The example environment 390 may include compute devices, such as desktop devices 332, imaging devices 334, and mobile devices 336. The desktop device 332 represents any appropriate compute device designed to stay in a location. The mobile devices 336 represent any appropriate compute device designed to be transportable, such as by a size and weight smaller than a desktop device. Imaging devices 334 represent any appropriate peripheral device with imaging capabilities including a movement mechanism (e.g., a pick), such as copiers, printers, and/or multifunction peripherals. The imaging device 334 includes a media location, such as a media tray assembly or an output bin. Example media locations may include a input areas (such as primary input tray, a secondary input tray, a manual feed input tray, an ADF, etc.) or output areas (such as an output tray or drop zone where media is ejected). The imaging devices 334 may include multiple trays where media may be stationed, such as a tray for an ADF and a manual feed tray.

The compute devices may be located on separate networks 330 or part of the same network 330. The example environment 390 may include any appropriate number of networks 330 and any number of the networks 330 may include a cloud compute environment. A cloud compute environment may include a virtual shared pool of compute resources. For example, networks 330 may be distributed networks comprising virtual computing resources. The engines and/or modules of the system 300 herein may reside and/or execute "on the cloud" (e.g., reside and/or execute on a virtual shared pool of resources). For example, the capture engine 302 and image processing tool 342 may be part of cloud applications enabled for access by a mobile device 336.

A link 338 generally represents one or a combination of a cable, wireless connection, fiber optic connection, or remote connections via a telecommunications link, an infrared link, a radio frequency link, or any other connectors of systems that provide electronic communication. For example, the mobile devices 336 and/or the desktop device 332 may be wirelessly connected to an imaging device 334. The link 338 may include, at least in part, intranet, the Internet, or a combination of both. The link 338 may also include intermediate proxies, routers, switches, load balancers, and the like.

Referring to FIGS. 1-3, the engines 102, 104, and 106 of FIG. 1 and/or the modules 202, 204, and 206 of FIG. 2 may be distributed across devices 332, 334, 336, or a combination thereof. The engine and/or modules may complete or assist completion of operations performed in describing another engine and/or module. For example, the capture engine 302 of FIG. 3 may request, complete, or perform the methods or operations described with the capture engine 102 of FIG. 1 as well as the connection engine 104 and the command engine 106 of FIG. 1. Thus, although the various engines and modules are shown as separate engines in FIGS. 1 and 2, in other implementations, the functionality of multiple engines and/or modules may be implemented as a single engine and/or module or divided in a variety of engines and/or modules. In some example, the engines of the system 300 may perform example operations described in connection with FIGS. 5 and 6

FIG. 4 depicts an example diagram of an example mobile capture device 400 and an example imaging device 410. Referring to FIG. 4, the example mobile capture device 400 includes a camera device 424 and a view screen 426. The view screen 426 of FIG. 4 depicts a user interface (UI) button 444 to initiate a capture operation 444 and captured data 440 representative of content of a media sheet 408. As discussed further herein, the button 444 may be enabled or disabled based on the state of the imaging device 410.

The example imaging device 410 of FIG. 4 includes a pick 412, a media tray 414, a wireless communication interface circuitry 416, a memory resource 420, and a processor resource 422. FIG. 4 depicts media loaded onto the tray 414 and the pick 412 in contact with a top sheet 408 of the stack of media. The memory resource 420 of FIG. 4 includes executable instructions stored thereon to allow the imaging device to move media (e.g., the top sheet 408) in coordination with the mobile capture device 400. For example, the memory resource 420 may be a computer readable storage medium comprising executable instructions that, when executed by the processor resource 422, cause coordination of the pick 412 to, in response to an indication that a sheet 408 of media is captured from the camera device 424 (e.g., located on the mobile capture device 400 that is separate from the imaging device 410), generate movement of the sheet 408 of media away from the media tray 414 (e.g., using the input tray as a capture zone). In other examples, the executed instruction may cause the pick 412 to generate movement the sheet of media onto the media tray 414 depending on the implementation (e.g., using the output tray as a capture zone).

As depicted in FIG. 4, the executed instructions may cause the pick 412 to rotate in the directions depicted by arrows 413 (e.g., clockwise and/or counterclockwise) to cause the sheet 408 to move in the directions depicted by arrows 409 (e.g., either move the sheet 408 into the capture zone or out of the capture zone). For example, the sheet 408 may be moved out of the capture zone after a confirmation from the mobile capture device 400 that the content of sheet 408 was captured or the sheet 408 may be moved into the capture zone to prepare for capturing the content of the sheet after the previous sheet was successfully captured by the mobile capture device 400. The sheet 408 and/or media stack may be moved in other directions (such as up or down via a tray lift) and/or the pick may be moved in other directions (such as up or down) not depicted in FIG. 4 to facilitate appropriate movement of the sheet 408 in or out of the zone of capture.

Example media trays include an ADF tray, a manual input tray, or an output tray. Example picks include a scanner pick roller or a paper pick roller. Example wireless communication interface circuitry may include a chip electrically coupled to an antenna, a network interface card (NIC) with wireless capability, or a universal serial bus (USB) dongle with a receiver and/or transmitter.

The imaging device 410 may include an imaging component, such as an optical scanner, a printhead, etc. The imaging component may be disabled during a capture session to avoid interference with a capture operation and/or movement operation. For example, the memory resource 420 may include instructions that, when executed by the processor resource, cause coordination of the processor resource 422 to cause disablement of the imaging component in response to a capture request; cause the wireless communication interface circuitry 416 to instruct the capture device 400 to, in response to a determination that the sheet of media moved out of a capture zone of the media tray 414, capture an image of the capture zone; and await indication that the image is captured.

The imaging device 410 may include a detection mechanism (e.g., an optical sensor, mechanical flag, etc.) that indicates to the imaging device 410 that media is located on the media tray 414. The imaging device 410 may communicate such information to the mobile capture device 400. For example, the memory resource 420 of the imaging device 410 may include instructions that, when executed by the processor resource 420, cause the imaging device 410 to send a command to the capture device 400 in response to media loaded on the tray 414 and/or send a command to the capture device 400 in response to a lack of media on the tray 414. In that example, the commands may be sent to the mobile capture device 400 via a wireless connection using the wireless communication circuitry 416.

FIGS. 5 and 6 are flow diagrams depicting an example methods 500 and 600 of coordination of capture and movement of media. Referring to FIG. 5, the example method 500 of coordination of capture and movement of media may include operations performed by a capture device 501 and operations performed by an imaging device 503. FIG. 5 refers the operations performed by the capture device as process 502 and the operations performed by the imaging device as the process 504. For example, the process 502 performed by the capture device 501 may include operations at blocks 506, 512, 516, 518, 524, 526, 528, 534, 536, and 538 and the process 504 performed by the imaging device 503 may include operations at blocks 508, 510, 514, 520, 522, 530, 532, 540. In other examples, the processes 502 and 504 may include less operations, operations in different orders, other operation not depicted in FIGS. 5 and 6, and/or a different combination of operations than what is depicted in FIGS. 5 and 6. The operations of processes 502 and 504 may be performed by circuitry or a combination of circuitry and executable instructions (such as engines 102, 104, and 106 of FIG. 1) on a device with a capture mechanism (such as a camera device) and/or a device with a movement mechanism (such as an imaging device with a pick roller).

At block 506, a pairing request is made between a capture device 501 and an imaging device 503 and the pairing authentication is established at block 508. At block 510, the devices are notified of a successful pairing or otherwise enabled to communicate via the paired connection. In the example of FIG. 5, the capture device 501 waits for a media notification from the imaging device at 512 (e.g., listens for a notification from the imaging device that media has been placed at the capture zone). In this example, the capture device 501 may have the capture session disabled until a notification is received from the imaging device 503 (e.g., the coordination feature to remotely operate the imaging device via the capture device for a multipage scan may be disabled).

At block 514, media is identified at the media tray and the capture device 501 is notified of the media identification. For example, the capture device 501 may be notified when media is identified by an optical sensor able to detect media in the tray via a light receiver or a mechanical flag near the base of the tray being physically moved by the media. At block 516, the capture session feature is enabled on the capture device 501 in response to the indication that media is in the capture zone. For example, a UI feature, such as a button, may display to indicate availability to perform a capture job on multipage media.

At block 518, a capture session is activated, such as by a user pressing the appropriate button on the UI of the capture device 501. A notification to the imaging device 503 may be sent to disable the pick of the imaging device for any operations other than those associated with the capture session at block 520. The imaging device 503 then waits at block 522 for the notification that a capture operation completed.

At block 524, an image is captured at the media location (e.g., the capture zone of the media tray). The image may be analyzed to determine whether the capture operation was successful or if the capture operation should be performed again. Once an image is successfully captured, the imaging device 503 is notified by the capture device 501 that a capture of the currently displayed media was successful at block 526. This indicates to the imaging device 503 that the displayed media should be moved at block 530 and the capture device 501 waits for a notification that displayed media has been moved at block 528.

Once the captured media content has been moved out of the capture zone and/or the next content has been moved into the capture zone, the imaging device notifies the capture device 501 that the move was completed and may also provide the state of media tray at block 532. At block 534, a determination of whether there is media in the tray may indicate that a capture cycle is to be repeated because there continues to be media for the capture session and another capture cycle will begin at block 524.

At block 536, if the determination of whether there is media in the tray indicates there is no media in the tray, a notification is sent to the imaging device to notify of the completion of the capture session and the capture session is ended at block 538. The imaging device 540 receives the indication that the capture session ended and enables the pick for other operations by the imaging device 503 at block 540. In this manner, the imaging device and the capture device are able to allow the capture device to utilize its image capture capabilities and allow the imaging device to use its media movement capabilities in a coordinated fashion and enable the devices to complete a multipage document capture with relatively little user interaction.

Referring to FIG. 6, the example method 600 of coordination of capture and movement of media may include operations performed by the capture device 601 as process 602 and the operations performed by the imaging device 603 as the process 604. FIG. 6 is a flow diagram similar to FIG. 5 with the exception that the capture operations and the movement operations coordinate in a different order for each capture cycle. Thus, blocks 606-640 are similar to blocks 506-540 and, for brevity, their descriptions are not repeated in their entirety. The differences depicted in FIG. 6 include that capture session beings by moving media to an output tray at block 630 (rather than performing an image capture first), the capture device 601 captures an image of the media at block 624 in response to a notification at block 632 that the move was completed, the capture device 601 notifies the imaging device 603 that a capture is successful, and the imaging device 603 determines if another capture cycle is to be performed based on whether there is media in the input tray at block 634, and ends the capture session via operations at blocks 636 (which send a notification to the mobile device 601) and 640 if there is no further media to capture in the input tray. In this manner, the imaging device 603 of FIG. 6 may manage whether to continue capture cycles rather than the mobile device 501 of FIG. 5 that manages the capture cycles in the example operations of FIG. 5.

Although the flow diagram of FIGS. 5 and 6 illustrates specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

All of the features disclosed in this specification (including any accompanying claims, abstract and drawings), and/or all of the elements of any method or process so disclosed, may be combined in any combination, except combinations where at least some of such features and/or elements are mutually exclusive.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A device comprising:
   a processor; and
   a memory storing a set of instructions executable by the processor to cause the device to:
   receive from an imaging device an indication that a media sheet is available at a media location of the imaging device for capture;
   capture an image of the media sheet at the media location of the imaging device in response to receipt of the indication that the media sheet is available; and
   instruct the imaging device to coordinate a movement of the media sheet in response to a completion of the capture of the image.

2. The device of claim 1, wherein the set of instructions is executable by the processor to cause the device to:
   enable the capture operation in response to a first indication from the imaging device that the media sheet is sensed at the media location of the imaging device; and
   disable the capture operation in response to a second indication from the imaging device that the media sheet is not sensed at the media location.

3. The device of claim 1, wherein the set of instructions is executable by the processor to cause the device to:
   send a command to the imaging device in response to a determination of whether to disable an imaging device feature based on a state of a capture session.

4. The device of claim 1, wherein the set of instructions is executable by the processor to cause the device to:
   perform capture cycles until an indication is received from the imaging device that there is no media sheet at the media location, a capture cycle including:
   a capture operation of capturing an image of a media sheet; and
   a movement operation of moving the media sheet away from a capture zone of the media location and moving another media sheet towards the capture zone.

5. The device of claim 1, further comprising:
   a camera to be kept stationary while the image of the media sheet is captured,
   wherein:

the media sheet is stationary while the image is captured; and the image is processed based on a perspective determination of the camera relative to a capture zone plane.

6. A non-transitory computer-readable memory resource storing a set of instructions executable by a processor resource of a mobile device to cause the mobile device to coordinate media capture and media movement with an imaging device, wherein the set of instructions is to cause the mobile device to:

receive from the imaging device an indication that a media sheet is available on the imaging device for capture;

capture an image of the media sheet on the imaging device in response to receipt of the indication that the media sheet is available; and send an instruction to the imaging device to move the media sheet in response to a completion of the capture of the image.

7. The non-transitory computer-readable memory resource of claim 6, wherein the set of instructions is executable by the processor resource to cause the mobile device to:

perform a pairing operation with the imaging device; and receive an indication that the media sheet is located on a tray of the imaging device.

8. The non-transitory computer-readable memory resource of claim 6, wherein the set of instructions is executable by the processor resource to cause the mobile device to:

send a capture state to the imaging device after the capture of the image while the media sheet still exists on a tray of the imaging device; and wherein the capture of the image happens in response to an indication that the media sheet has passed out of line of sight of a camera of the mobile device.

9. The non-transitory computer-readable memory resource of claim 6, wherein the set of instructions is executable by the processor resource to cause the mobile device to:

initiate a capture session based on a load mechanism at the imaging device being activated;

continue capture cycles until the load mechanism is deactivated; and provide an indication that the capture session is complete in response to the deactivation of the load mechanism.

10. The non-transitory computer-readable memory resource of claim 6, wherein the set of instructions is executable by the processor resource to cause the mobile device to:

modify the captured image using an image processing technique; and provide a preview of a completed capture job including the captured image.

11. A method for a mobile device to coordinate media capture and media movement with an imaging device, comprising:

waiting, by the mobile device, to receive an indication from an imaging device indicating that a media sheet is available on the imaging device for capture;

capturing, by a camera of the mobile device, an image of the media sheet on the imaging device in response to receipt of the indication that the media sheet is available; and sending, by a processor of the mobile device, an instruction to the imaging device to move the media sheet in response to a completion of the capture of the image.

12. The method of claim 11, further comprising:

prior to receiving the indication that the media sheet is available at the imaging device, performing, by the processor of the mobile device, a pairing operation with the imaging device.

13. The method of claim 11, further comprising:

sending a capture state to the imaging device after the capture of the image while the media sheet still exists on a tray of the imaging device.

14. The method of claim 11, comprising:

initiating, by the processor of the mobile device, a capture session based on a load mechanism at the imaging device being activated;

continuing, by the processor, capture cycles until the load mechanism at the imaging device is deactivated; and providing, by the processor, an indication that the capture session is complete in response to the deactivation of the load mechanism.

15. The method of claim 11, further comprising:

modifying the captured image using an image processing technique, and providing a preview of a completed capture job including the captured image.

* * * * *